G. F. DRAKE.
NUT LOCK.
APPLICATION FILED OCT. 18, 1916.
1,271,449.
Patented July 2, 1918.
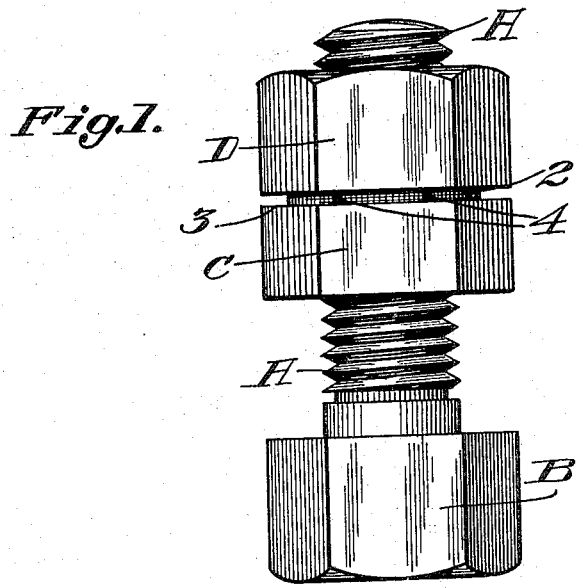
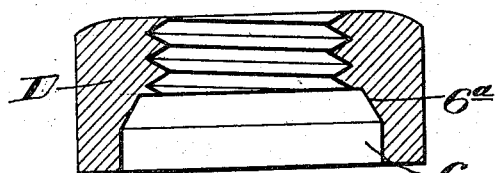
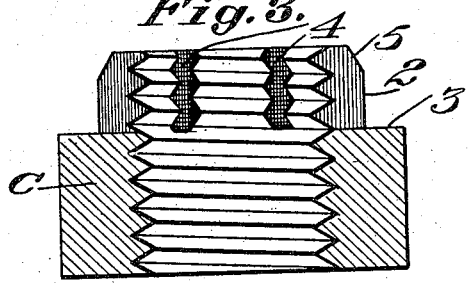
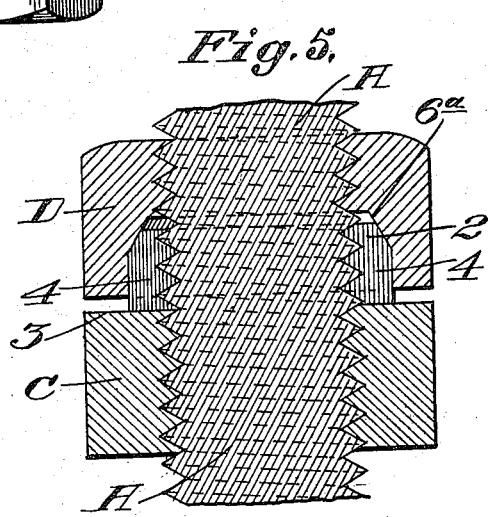
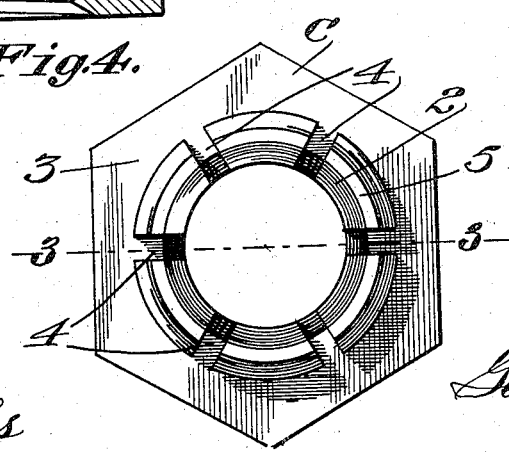
WITNESSES:
Charles Rickles
Thos Castberg
INVENTOR
George F. Drake
BY Strong & Townsend
ATTORNEYS

UNITED STATES PATENT OFFICE.

GEORGE F. DRAKE, OF OAKLAND, CALIFORNIA.

NUT-LOCK.

1,271,449.

Specification of Letters Patent.   Patented July 2, 1918.

Application filed October 18, 1916.  Serial No. 126,417.

*To all whom it may concern:*

Be it known that I, GEORGE F. DRAKE, a citizen of the United States, residing at Oakland, in the county of Alameda and State of California, have invented new and useful Improvements in Nut-Locks, of which the following is a specification.

This invention relates to improvements in lock nut devices of that class in which the device is in two parts, one of which has a split or slotted extension with a conical or tapering exterior surface and is locked in position by means of the second or lock nut part which has a conical and tapering top interior surface and is screwed down upon the bolt outside the other part or nut.

In such devices the surfaces so coöperate that on screwing up the locking part of the nut, the two conical or tapering parts co-act to cause the one or the other part to grip the bolt tightly but hitherto the construction and arrangement have been such as to be liable to cause either one or other of the two parts (according to which is employed as the lock-nut) to bind prematurely on the bolt, or before the lock-nut part is screwed down in position; or else an alinement between the two parts must be made and maintained, which is not convenient.

According to the present invention, the extension from the main nut is smooth on the exterior, and is of cylindrical shape leading to a coned or beveled extremity. The lock nut is provided with a smooth cylindrical portion to slide upon the exterior of the main nut and this smooth bore leads to a conical seating which in turn leads to the screw-threaded portion of the lock nut; the coned portion of the lock nut is thus intermediate between the cylindrical bore and the screw-threaded portion of the lock nut. It will be noted that the clamping or compressing upon the bolt, of the split extensions from the main nut, takes place only during the last stage of the engagement of the lock nut with the main nut, namely after the smooth cylindrical portions are engaged and as the beveled faces make contact.

It also includes details of construction which will be more fully explained by reference to the accompanying drawings, in which—

Figure 1 is a view of a bolt with the main and lock-nuts in position.

Fig. 2 is a section of the lock-nut.

Fig. 3 is a section of the main nut.

Fig. 4 is a vertical section of Fig. 1.

Fig. 5 is a top view of the main nut.

A is a screw-threaded bolt, having a head B; and C is a main nut which is turnable upon the screw threads so as to clamp the part to be held, between the head B and the nut C. The lower part of the nut is solid and it has an external screw-threaded extension 2 forming a shoulder 3 with the lower solid portion of the nut. The external extension 2 is smooth, *i. e.*, not screw-threaded, and the entire length of the nut and the extension are threaded interiorly to fit and turn upon the threads of the bolt and thus presents a long holding interior with many holding threads.

The extension 2 has a number of slots 4 cut longitudinally in its sides and its upper end is beveled, as at 5, so that by suitable pressure the upper end of the extension may be compressed and the portions between the slots may be forced into gripping contact with the bolt threads.

The lock-nut D has a countersunk interior 6 also without screw-threads to pass over the extension 2 and a convergent upper end 6ª coacting with the beveled end 5 of the extension 2, so that when the holding nut C has been turned down into holding contact with the part to be held, the nut D may afterward be turned and advanced to inclose the extension 2 and finally to grip the upper beveled ends of the slotted extension and compress them to form an immovable grip upon the bolt.

It will be evident that by this construction the nut C may first be turned independently down upon the part to be held. The locking nut may be afterward applied and turned down, the smooth cylindrical bore 6 being guided upon the smooth exterior cylinder 2 until its interior cone engages the extremital cone of the extension 2 and compresses it so as to lock the main holding nut in place.

The advantage of this construction over one in which the interior bevel might be formed within the main nut and the extension with the beveled end formed upon a split lock nut is that in the latter case the outer nut would be locked before being actually in contact with the inner one.

If the main and lock nuts are connected so as to turn together, both must be applied to the bolt at once and in order to prevent one or the other from binding against the bolt threads, while being advanced, an alinement must be made and maintained, while turning, which in difficult positions is almost impossible.

The present construction presents no difficulties in manufacture or use and is very cheap and effective. The shell of the locking nut may also be made thicker and stronger without increasing its exterior diameter.

Having thus described my invention, what I claim and desire to secure by Letters Patens is—

In a nut lock, a main nut having an extension, said extension having a smooth periphery with its outer end beveled and being longitudinally slotted, the interior of said extension having threads forming extensions of the nut threads, and a wrench engaging lock nut having an annular beveled part and an elongated smooth annular guide part of slightly greater diameter than that of the extension to receive the latter, and slide thereon prior to engagement of the beveled parts of both nuts, said annular beveled part being located at substantially the longitudinal center of the lock nut so as to lie completely within and at about the center of the body of the latter and in register with the points of greatest effectiveness of the wrench, and the outer extremity of the beveled end of the extension of the main nut being formed so as to leave clearance between same and the inner end of the annular beveled part of the lock nut and to also leave clearance between the inner face of the lock nut and the adjacent face of the main nut.

In testimony whereof I have hereunto set my hand in the presence of two subscribing witnesses.

GEORGE F. DRAKE.

Witnesses:
JOHN H. HERRING,
W. W. HEALEY.